(12) United States Patent
Kadirvel et al.

(10) Patent No.: US 11,431,042 B2
(45) Date of Patent: Aug. 30, 2022

(54) BATTERY PACK ARCHITECTURE FOR PARALLEL CONNECTION OF CELLS

(71) Applicant: META PLATFORMS TECHNOLOGIES, LLC, Menlo Park, CA (US)

(72) Inventors: Karthik Kadirvel, San Jose, CA (US); Jason Howard, Alpharetta, GA (US); Michael Xingyi Yu, Mountain View, CA (US); Bryan W. Fan, San Francisco, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 29 days.

(21) Appl. No.: 17/014,861

(22) Filed: Sep. 8, 2020

(65) Prior Publication Data

US 2021/0075074 A1    Mar. 11, 2021

Related U.S. Application Data

(60) Provisional application No. 62/898,491, filed on Sep. 10, 2019.

(51) Int. Cl.
*H01M 10/637* (2014.01)
*H01M 10/04* (2006.01)
*H01M 10/0583* (2010.01)

(52) U.S. Cl.
CPC ........ *H01M 10/637* (2015.04); *H01M 10/045* (2013.01); *H01M 10/0431* (2013.01); *H01M 10/0583* (2013.01); *H01M 2200/106* (2013.01)

(58) Field of Classification Search
CPC .......... H01M 50/581; H01M 2200/10; H01M 10/4235; H01M 10/637; H01M 50/572;
(Continued)

(56) References Cited

U.S. PATENT DOCUMENTS

| | | | | |
|---|---|---|---|---|
| 5,498,489 A | * | 3/1996 | Dasgupta | ........ H01M 10/0413 429/231.1 |
| 5,582,931 A | * | 12/1996 | Kawakami | ........ H01M 10/0413 429/162 |

(Continued)

*Primary Examiner* — Imran Akram
(74) *Attorney, Agent, or Firm* — Morgan, Lewis & Bockius LLP

(57) ABSTRACT

A battery system includes a plurality of battery cells connected in parallel. Each battery cell includes a positive and negative tab. The battery system also includes a plurality of thermal switch devices (e.g., temperature cut off (TCO) or positive temperature coefficient (PTC) devices). Each thermal switch device is electrically coupled to a respective cell. The battery system further includes a rigid-flex circuit board comprising a plurality of rigid regions. Each rigid region is physically and electrically connected to an adjacent rigid region by a respective flexible region. Each rigid region is electrically coupled to respective positive and negative tabs of a respective battery cell. Each thermal switch device prevents abnormal current flow (e.g., by limiting the flow of current at high temperatures) between a first battery cell that is coupled to the thermal switch device and a second battery cell that is adjacent to the first battery cell.

9 Claims, 10 Drawing Sheets

(58) Field of Classification Search
CPC ....... H01M 2200/106; H01M 10/0431; H01M 10/045; H01M 10/0583
See application file for complete search history.

(56) References Cited

U.S. PATENT DOCUMENTS

| | | | |
|---|---|---|---|
| 2003/0008206 A1* | 1/2003 | Hong | H01M 10/052 |
| | | | 429/254 |
| 2013/0011700 A1* | 1/2013 | Park | H01M 50/54 |
| | | | 429/7 |
| 2013/0207612 A1* | 8/2013 | Lev | H01M 10/425 |
| | | | 429/158 |
| 2014/0227583 A1* | 8/2014 | Do | H01M 10/0583 |
| | | | 29/623.5 |
| 2015/0044511 A1* | 2/2015 | Kim | H01M 10/486 |
| | | | 429/7 |
| 2016/0372796 A1* | 12/2016 | Nishihara | H01M 50/569 |
| 2019/0269009 A1* | 8/2019 | Park | H05K 1/028 |
| 2019/0387618 A1* | 12/2019 | Schäuble | H05K 3/0044 |
| 2021/0328326 A1* | 10/2021 | Rouvala | H01Q 1/243 |

\* cited by examiner

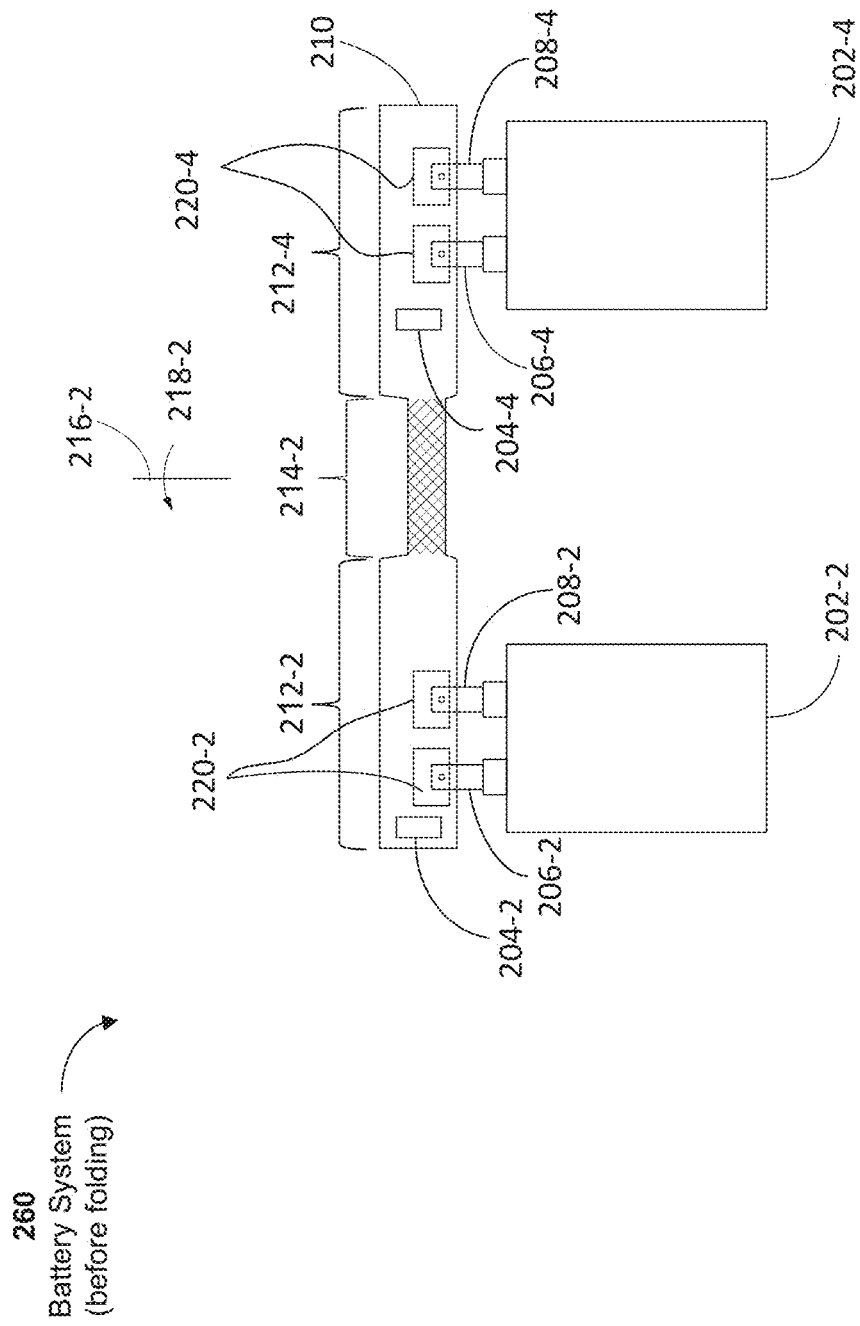

260 Battery System (after folding, isometric view)

202-4
202-2

BATTERY PACK ARCHITECTURE FOR PARALLEL CONNECTION OF CELLS

RELATED APPLICATIONS

The current application claims priority to U.S. Provisional Application Ser. No. 62/898,491, filed on Sep. 10, 2019, entitled "Battery Pack Architecture for Parallel Connection of Cells," which is incorporated by reference herein in its entirety.

TECHNICAL FIELD

The disclosed implementations relate generally to battery systems, and more specifically to a battery architecture for parallel connection of battery cells.

BACKGROUND

Consumer electronic products use one or more batteries as power sources. The batteries are comprised of cells connected in parallel or in series to provide added power capacity or to support longer runtime for the consumer products without having to charge the batteries. However, connecting cells present at least two challenges. First, batteries are housed in enclosures that are designed to be thin to meet product use-case and aesthetic requirements. Because of this, battery systems with compact form factors are preferred to bulkier configurations. However, connecting multiple cells necessarily adds to overall size of a battery system. Second, when cells are connected in parallel and there is a defect (e.g., a short) in a battery cell, another (non-defective) battery cell can dump current into the defective battery cell, potentially resulting in a thermal runaway condition. Thermal runaway is the sudden release of the cell's stored energy as heat which may severely damage the host device and/or pose other risks to the user. Although some conventional solutions exist to address the adjacent short circuit condition (e.g., by adding a temperature cut off (TCO) device or a positive temperature coefficient (PTC) device to the battery system), such solutions need to be integrated into the battery system so as to meet stringent size (and cost) constraints in consumer products.

SUMMARY

Accordingly, there is a need for a robust and low cost solution, with minimal impact to product design, for parallel connection of batteries. The systems described herein provide such a solution. In addition to preventing thermal runaway from short circuits in adjacent cells, the systems provide assembly advantages (e.g., the overall assembly is more compact compared to conventional arrangements).

In one aspect, a battery system includes a plurality of battery cells connected in parallel. In some implementations, the battery system includes at least three battery cells. Each battery cell includes a positive tab and a negative tab extending from a respective side. The battery system also includes a plurality of thermal switch devices. Each thermal switch device is electrically coupled to a respective battery cell.

The battery system also includes a rigid-flex circuit board comprising a plurality of rigid regions. Each rigid region is physically and electrically connected to an adjacent rigid region by a respective flexible region. Each rigid region is electrically coupled to a respective positive tab and a respective negative tab of a respective battery cell.

In some implementations, each thermal switch device is configured to prevent a thermal runaway condition between a first battery cell that is coupled to the thermal switch device and a second battery cell that is adjacent to the first battery cell. In some implementations, each thermal switch device is electrically coupled to a respective battery cell via its positive tab, and prevents the thermal runaway condition by limiting (or shutting off) the flow of current from the respective battery cell via its positive tab when an operating temperature exceeds a threshold temperature. In some implementations, each thermal switch device is either a temperature cut off (TCO) device or a positive temperature coefficient (PTC) device.

In some implementations, the number of thermal switch devices is less than the number of battery cells. In some implementations, a battery cell with a positive tab welded to a rigid region at a respective end of the rigid-flex circuit board is not coupled to a thermal switch device.

In some implementations, the plurality of battery cells is electrically connected in parallel to a protection circuit that protects the battery system from one or more failure modes.

In some implementations, each flexible region is bent radially, thereby stacking each battery cell on top of another.

In some implementations, each rigid region is physically coupled to a respective positive tab and a respective negative tab of a respective battery cell by welding.

Thus, battery systems are provided for parallel connection of cells. The battery systems protect against cell shorts, and prevent thermal runaway conditions. The battery systems described herein are more compact compared to conventional battery systems.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 2C illustrates a battery system with two battery cells connected in parallel, which prevents abnormal current flow, in accordance with some implementations of the present disclosure.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1A:
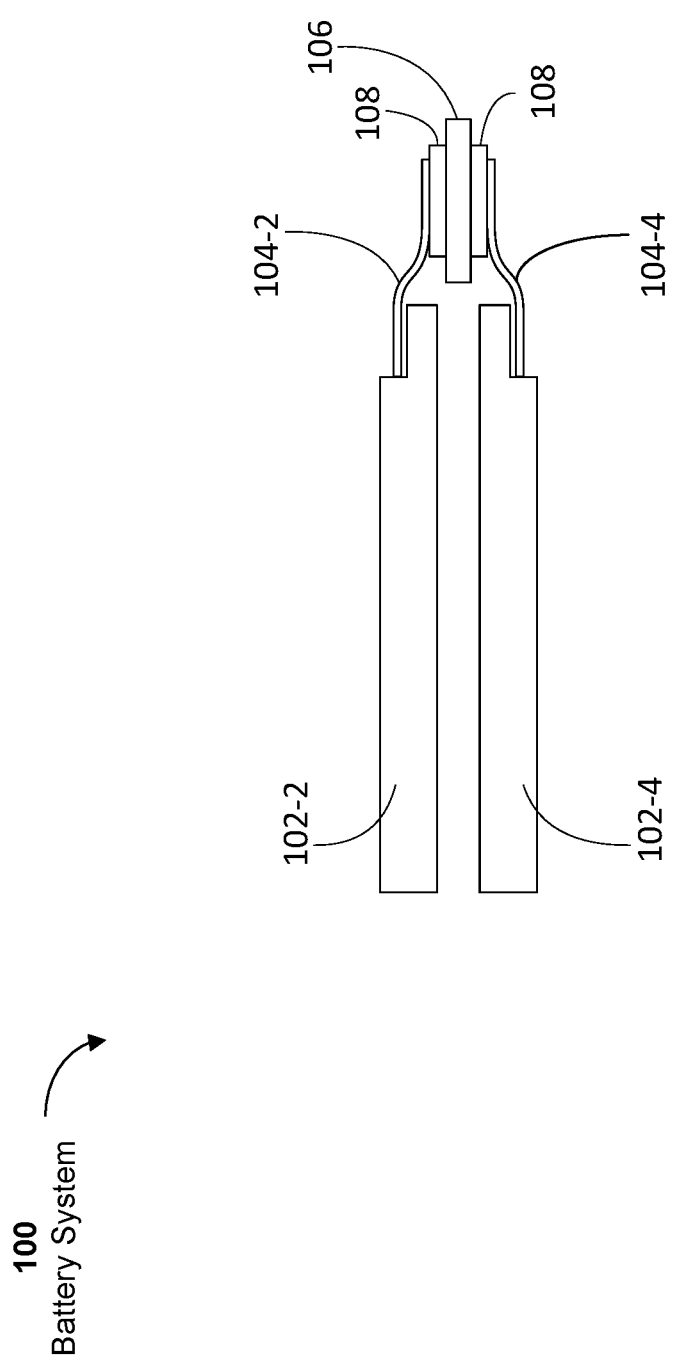
FIG. 1A illustrates a conventional battery system with two battery cells connected in parallel.

FIG. 1A illustrates a conventional battery system 100 with two battery cells connected in parallel. In conventional battery systems, to increase system run time, multiple pouch cells are connected in parallel (multi P) and/or in series (multi S) to increase the battery pack capacity. In typical parallel connection of batteries, the positive and negative terminals are welded together on either side of a protection control module. FIG. 1A shows two cells 102-2 and 102-4 (e.g., lithium ion pouch cells) connected (e.g., by welding respective cell tabs 104-2 and 104-4 using weld pads 108) on either side of a printed circuit board 106 (PCB), which has one or more protection circuits (shown in FIG. 1B).

Figure 1B:
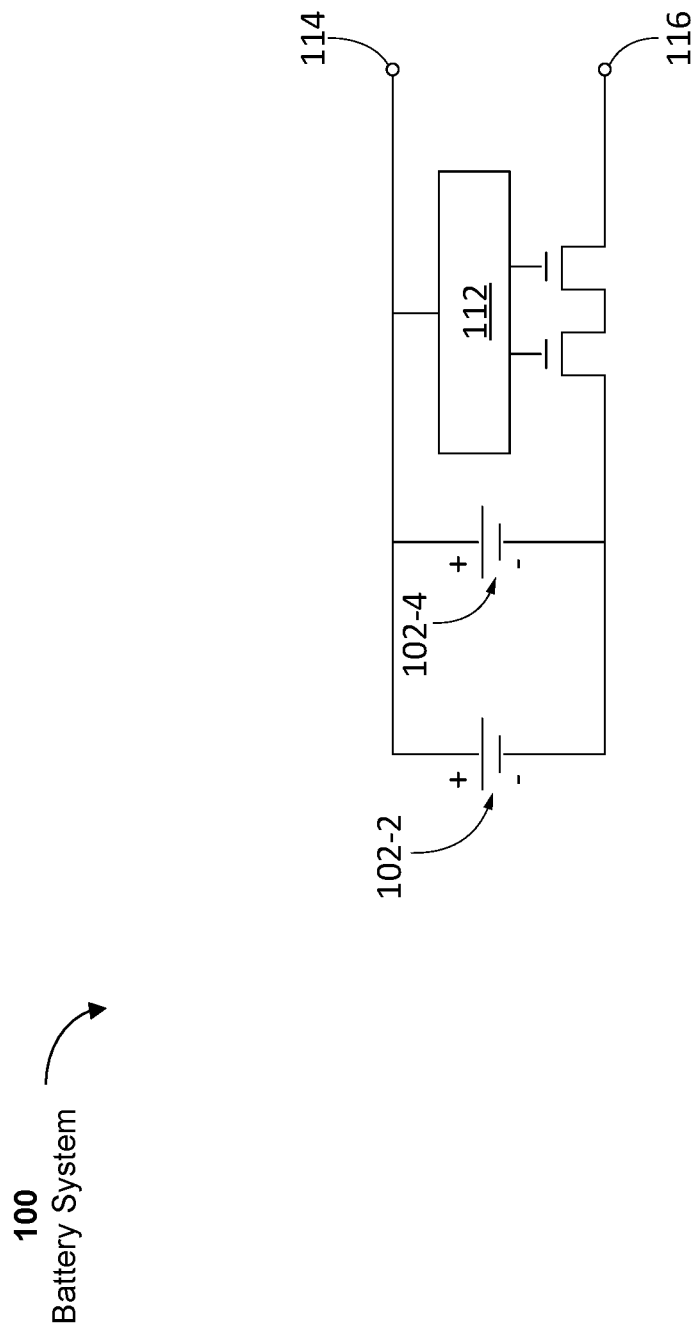
FIG. 1B illustrates an electrical circuit of the battery system shown in FIG. 1A, in accordance with some implementations.

FIG. 1B illustrates an electrical equivalent circuit of the battery system 100 shown in FIG. 1A, in accordance with some implementations. The battery system 100 includes a positive terminal 114 and a negative terminal 116. A protection circuit 112 protects the battery system 100 from abnormal conditions or failure modes. Such conditions may include over voltage, under voltage, over temperature, excessive charging current, excessive discharging current, and/or short circuit. Without protection, under such conditions, a cell may experience degraded performance (e.g., higher impedance, increased capacity fade). In extreme situations, the battery system may experience a thermal runaway. For example, when one of the cells has a defect (e.g., a cell short), a good cell (i.e., a cell without the defect) can dump energy into the defective cell, possibly leading to a thermal runaway condition. For example, in FIG. 1B, if there is a short in the cell 102-2, the cell 102-4 can dump current into the cell 102-2 and cause the cell 102-2 to go into thermal runaway. A conventional solution to address the thermal runaway condition is to add a temperature cut off (TCO) or positive temperature coefficient (PTC) device on the positive terminal (of each cell) before the cells are welded to the PCB.

Figure 2A:
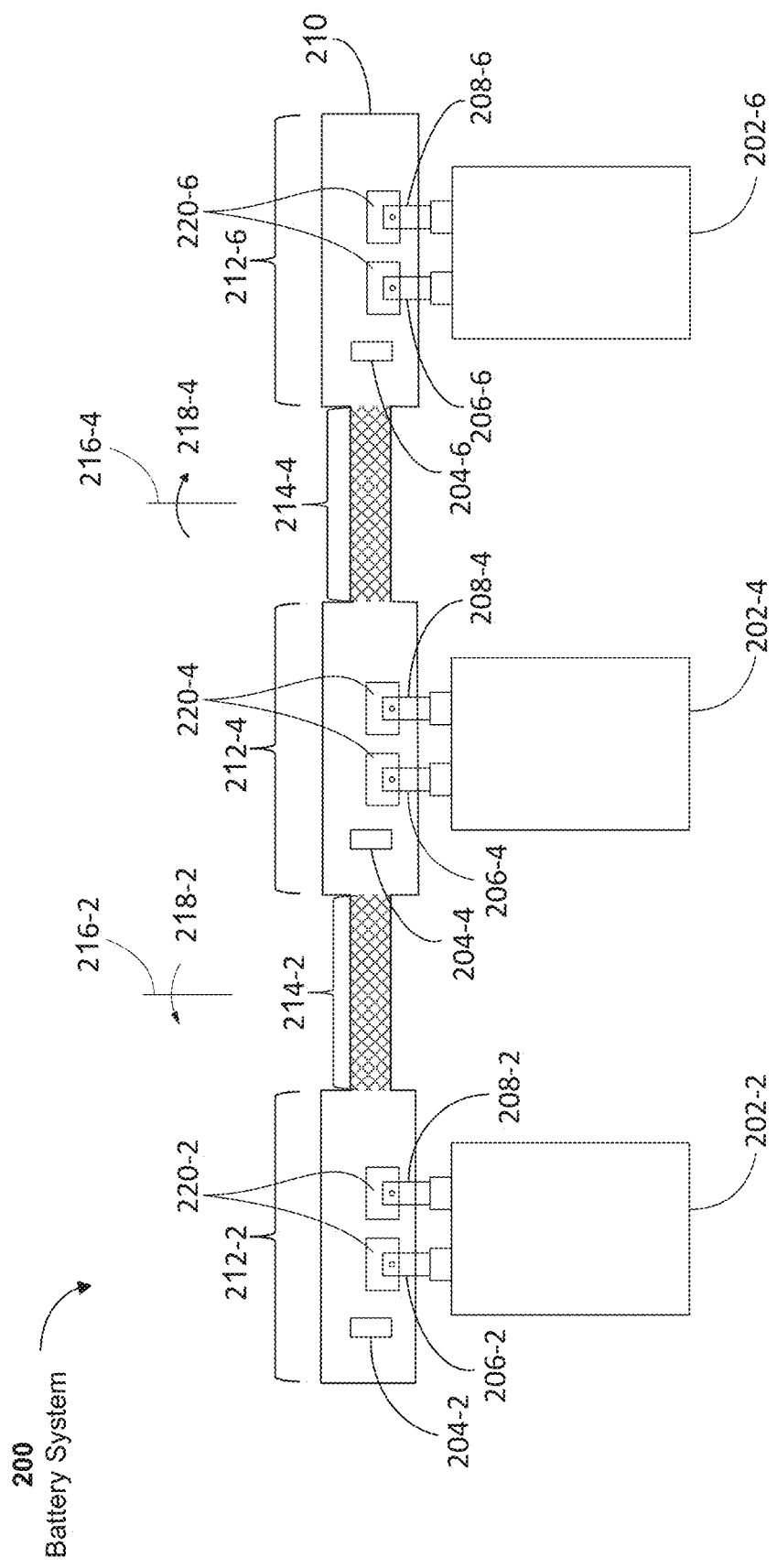
FIG. 2A illustrates a battery system architecture that prevents thermal runaway conditions, in accordance with some implementations of the present disclosure.

FIG. 2A illustrates a battery system architecture 200 that prevents abnormal current flow, in accordance with an implementation of the present disclosure. Apart from protecting against adjacent short circuits, the arrangement shown in FIG. 2A provides assembly advantages (e.g., the overall assembly is more compact compared to the arrangement in FIG. 1A). In some implementations, the arrangement also reduces impedance.

The battery system 200 includes a plurality of battery cells (e.g., cells 202-2, 202-4, and 202-6) connected in parallel. In some implementations, the battery system includes at least three battery cells. For example, in FIG. 2A, the battery system 200 includes the three battery cells 202-2, 202-4, and 202-6. Each battery cell includes a positive tab and a negative tab extending from a respective side. For example, in FIG. 2A, the battery cell 202-2 has a positive tab 206-2 and a negative tab 208-2, the battery cell 202-4 has a positive tab 206-4 and a negative tab 208-4, and the battery cell 202-6 has a positive tab 206-6 and a negative tab 208-6, extending from one side of the batteries.

The battery system 200 also includes a plurality of thermal switch devices (e.g., the devices 204-2, 204-4, and 204-6). Each thermal switch device is electrically coupled (e.g., using a technique, such as welding, described below) to a respective battery cell. For example, in FIG. 2A, the device 204-2 is electrically coupled to the cell 202-2, the device 204-4 is electrically coupled to the cell 202-4, and the device 204-6 is electrically coupled to the cell 202-6. In some implementations, each thermal switch device is a temperature cut off (TCO) device or a positive temperature coefficient (PTC) device.

The battery system 200 also includes a rigid-flex circuit board 210 comprising a plurality of rigid regions (e.g., the regions 212-2, 212-4, and 212-6). Each rigid region is physically and electrically connected to an adjacent rigid region by a respective flexible region. For example, in FIG. 2A, the rigid region 212-2 is connected to the rigid region 212-4 by a flex region 214-2, and the rigid region 212-4 is connected to the rigid region 212-6 by a flex region 214-4, according to some implementations. Each rigid region is electrically coupled to respective positive and negative tabs of a respective battery cell. For example, in FIG. 2A, the rigid region 212-2 is electrically coupled to the positive tab 206-2 and the negative tab 208-2 of the battery cell 202-2, the rigid region 212-4 is electrically coupled to the positive tab 206-4 and negative tab 208-4 of the battery cell 202-4, and the rigid region 212-6 is electrically coupled to the positive tab 206-6 and negative tab 208-6 of the battery cell 202-6, according to some implementations.

In some implementations, each thermal switch device is configured to prevent a thermal runaway condition between a first battery cell that is coupled to the thermal switch device and a second battery cell that is adjacent to the first battery cell. For example, in FIG. 2A, the thermal switch device 204-2 prevents abnormal current flow between the battery cell 202-2 and the battery cell 202-4. The thermal switch device 204-4 prevents abnormal current flow between the battery cell 202-2 and the battery cell 202-4 and also prevents abnormal current flow between the battery cell 202-4 and the battery cell 202-6. And, the thermal switch device 204-6 prevents abnormal current flow between the battery cell 202-4 and the battery cell 202-6.

In some implementations, each thermal switch device is electrically coupled to a respective battery cell via its positive tab, and prevents the abnormal current flow by limiting (or shutting off) the flow of current from the respective battery cell via its positive tab when an operating temperature exceeds a threshold temperature. For example, in FIG. 2A, the thermal switch device 204-2 is electrically coupled to the battery cell 202-2 via the positive tab 206-2, the thermal switch device 204-4 is electrically coupled to the battery cell 202-4 via the positive tab 206-4, and the thermal switch device 204-6 is electrically coupled to the battery cell 202-6 via the positive tab 206-6, according to some implementations. The electrical operations, including shutting off the flow of current, are discussed below with reference to FIG. 2B.

In some implementations, the number of thermal switch devices is less than the number of battery cells. In some implementations, the battery cell with its positive tab welded to a rigid region at an end of the rigid-flex circuit board is not coupled to a thermal switch device. For example, in FIG. 2A, the battery cell 202-6 welded to the end of the rigid-flex circuit board 210 omits a thermal switch device, according to some implementations.

In some implementations, the plurality of battery cells is electrically connected in parallel to a protection circuit that protects the battery system from one or more failure modes. An example is discussed below in reference to FIG. 2B.

In some implementations, each flexible region is bent radially, thereby stacking each battery cell on top of another. For example, in FIG. 2A, the battery cell 202-4 is stacked on top of the battery cell 202-2 by radially bending the flexible region 214-2 (along the axis 216-2 in a first direction 218-2), according to some implementations. And, the battery cell 202-6 is stacked on top of the battery cell 202-4 by radially bending the flexible region 214-4 (along the axis 216-4, which is substantially parallel to the axis 216-2, and in a second direction 218-4, opposite to the first direction 218-2), according to some implementations.

In some implementations, each rigid region is physically coupled to respective positive and negative tabs of a respective battery cell by welding. For example, in FIG. 2A, the rigid region 212-2 is physically coupled to the positive tab 206-2 and the negative tab 208-2 of the battery cell 202-2 by the welding 220-2, the rigid region 212-4 is physically coupled to the positive tab 206-4 and the negative tab 208-4 of the battery cell 202-4 by the welding 220-4, and the rigid region 212-6 is physically coupled to the positive tab 206-6 and the negative tab 208-6 of the battery cell 202-6 by the welding 220-6, according to some implementations.

Figure 2B:
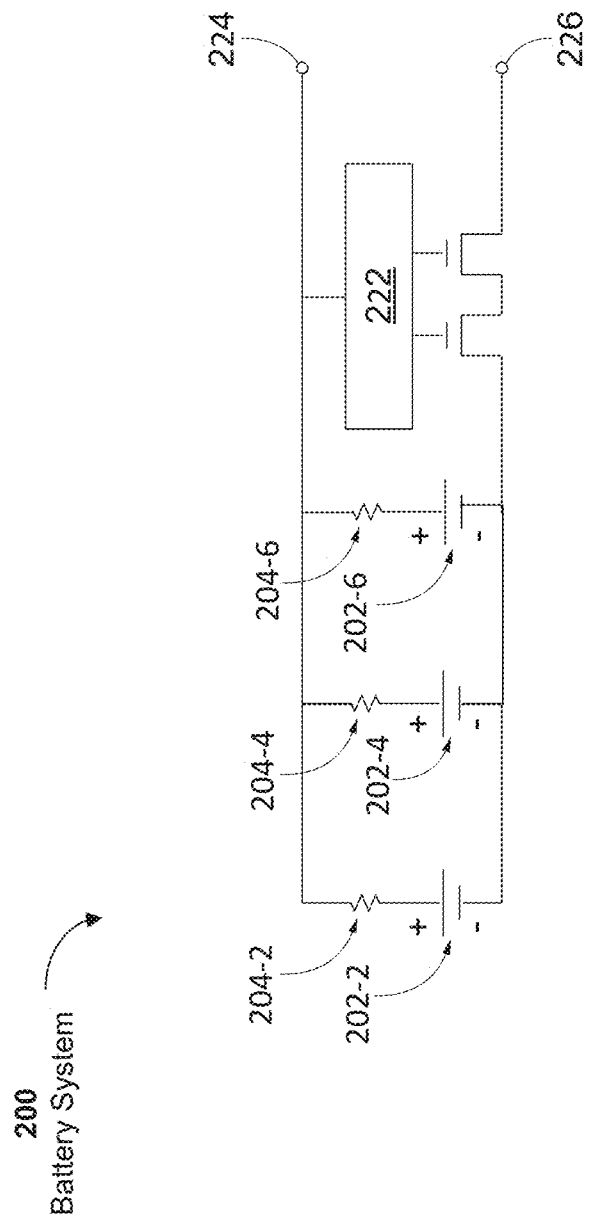
FIG. 2B illustrates an electrical circuit of the battery system architecture shown in FIG. 2A, in accordance with some implementations.

FIG. 2B illustrates an electrical circuit of the battery system architecture 200 shown in FIG. 2A, in accordance with some implementations. The battery cells 202-2, 202-4, and 202-6 are connected in parallel. FIG. 2B, similar to FIG. 2A, also shows a protection circuit 222 connected in parallel to the battery cells to protect the battery system 200 from abnormal conditions. The battery system 200, similar to the battery system 100, also has a positive terminal 224 and a negative terminal 226 for the battery pack, according to some implementations. A respective thermal switch device (e.g., a PTC) is connected to the positive tab of each battery cell. In FIG. 2B, for example, the device 204-2 is connected to the positive tab of the battery cell 202-2, the device 204-4 is connected to the positive tab of the battery cell 202-4, and the device 204-6 is connected to the positive tab of the battery cell 202-6. If the battery cell 202-2 has a fault, the cell 202-4 could dump current, which would in turn cause the thermal switch devices 204-2 and 204-4 to have high resistance. Thus, the devices 202-2 and 202-4 prevent the current path (sometimes referred to as shutting off or limiting the flow of current) between the cells 202-2 and 202-4, thereby protecting the battery pack from abnormal current flow.

Figure 2D:
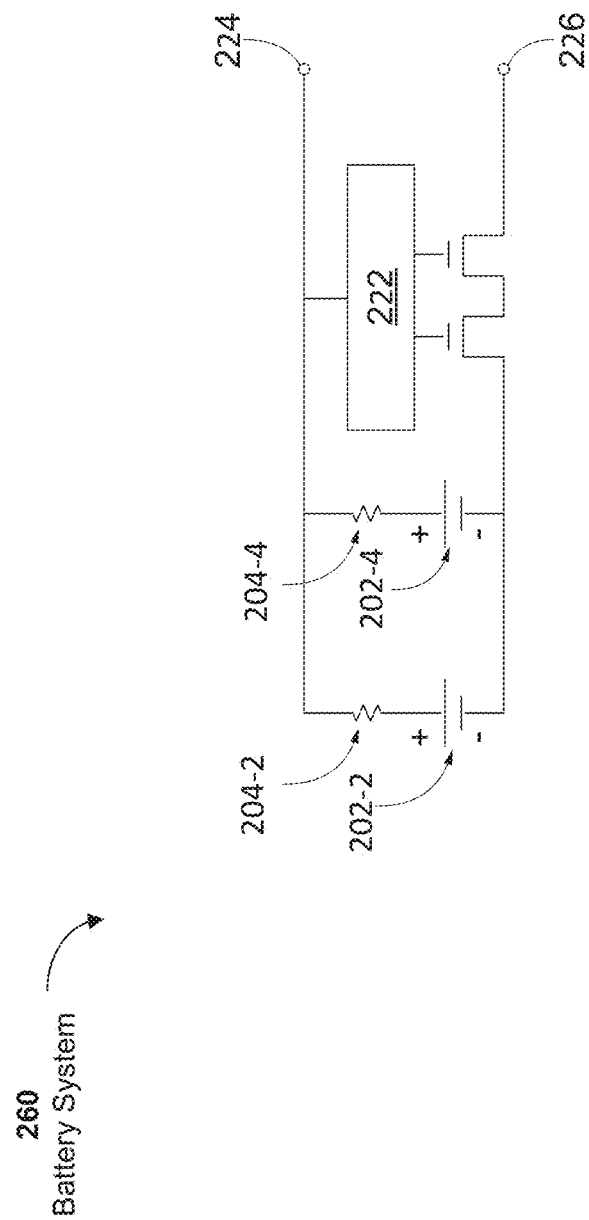
FIG. 2D illustrates an electrical circuit of the battery system shown in FIG. 2C, in accordance with some implementations.

FIG. 2C illustrates a battery system 260 (with two battery cells 202-2 and 202-4 connected in parallel) that prevents abnormal current flow, in accordance with an implementation of the present disclosure. FIG. 2D illustrates an electrical circuit of the battery system 260 shown in FIG. 2C, in accordance with some implementations. The individual elements in FIG. 2C have similar properties and structures as the corresponding elements in FIG. 2A, as indicated by the numberings used in both the drawings.

Figure 2E:
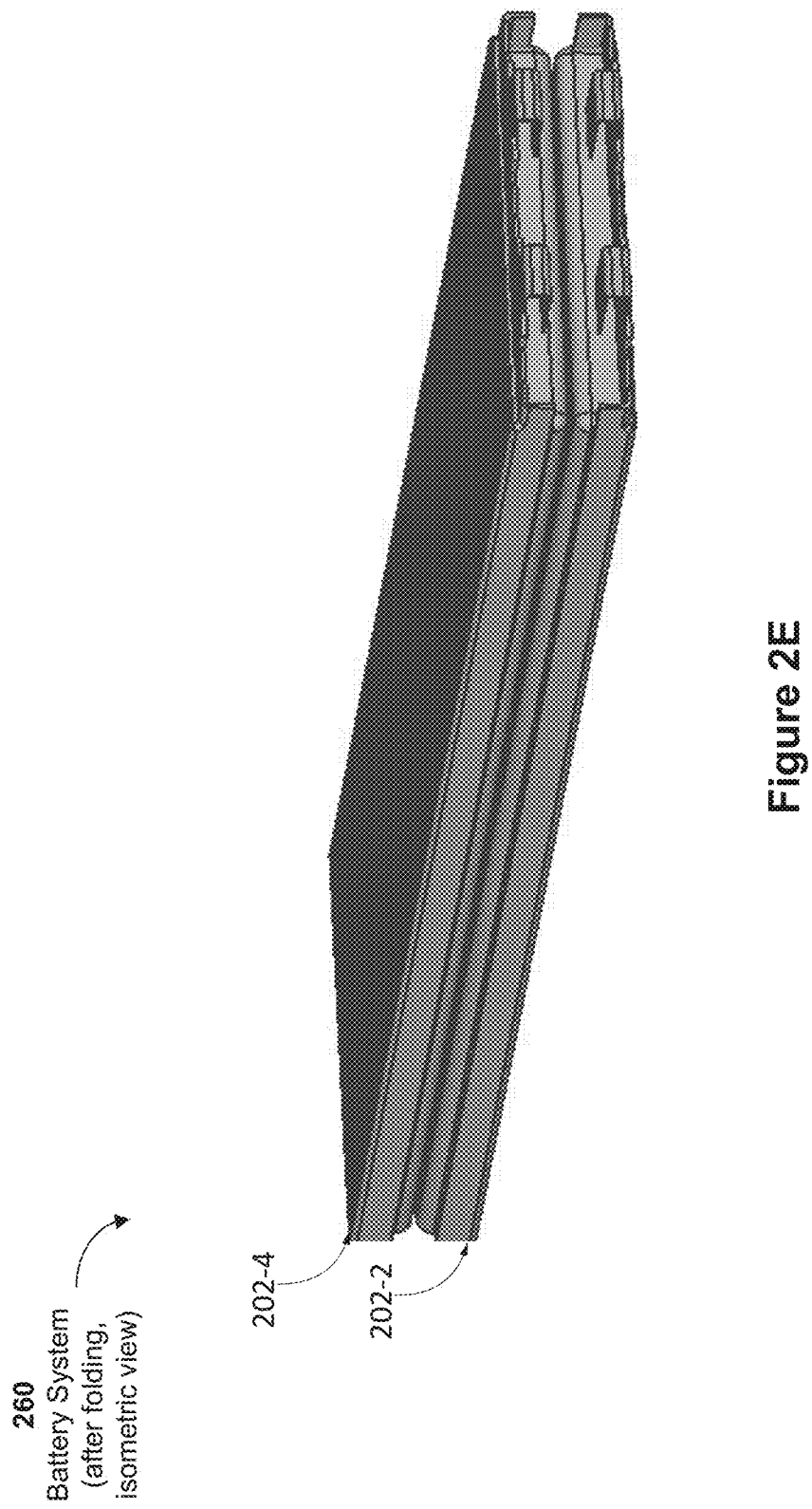
FIG. 2E illustrates an isometric view of the battery system shown in FIG. 2C after folding the configuration around an axis and stacking the battery cells, according to some implementations.

FIG. 2E illustrates an isometric view of the battery system 260 shown in FIG. 2C after folding the configuration around an axis (e.g., the axis 216-2) and stacking the battery cells 202-2 and 202-4, according to some implementations. As illustrated, the arrangement shown in FIG. 2E provides assembly advantages (e.g., the overall assembly is more compact compared to the arrangement in FIG. 1A), according to some implementations.

Thus, battery systems in accordance with implementations of the present disclosure protect against cell shorts. Additionally, consumer products that incorporate such battery systems have reduced product volume.

Disclosed battery systems may be implemented in conjunction with various types of artificial-reality systems. "Artificial reality" constitutes any form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect for a viewer). In some implementations, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial reality systems are designed to work without near-eye displays (NEDs), such as the AR system 300 in FIG. 3. Other artificial reality systems include an NED, which provides visibility into the real world (e.g., the AR system 400 in FIG. 4) or that visually immerses a user in an artificial reality (e.g., the VR system 500 in FIG. 5). While some artificial reality devices are self-contained systems, other artificial reality devices communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 3:
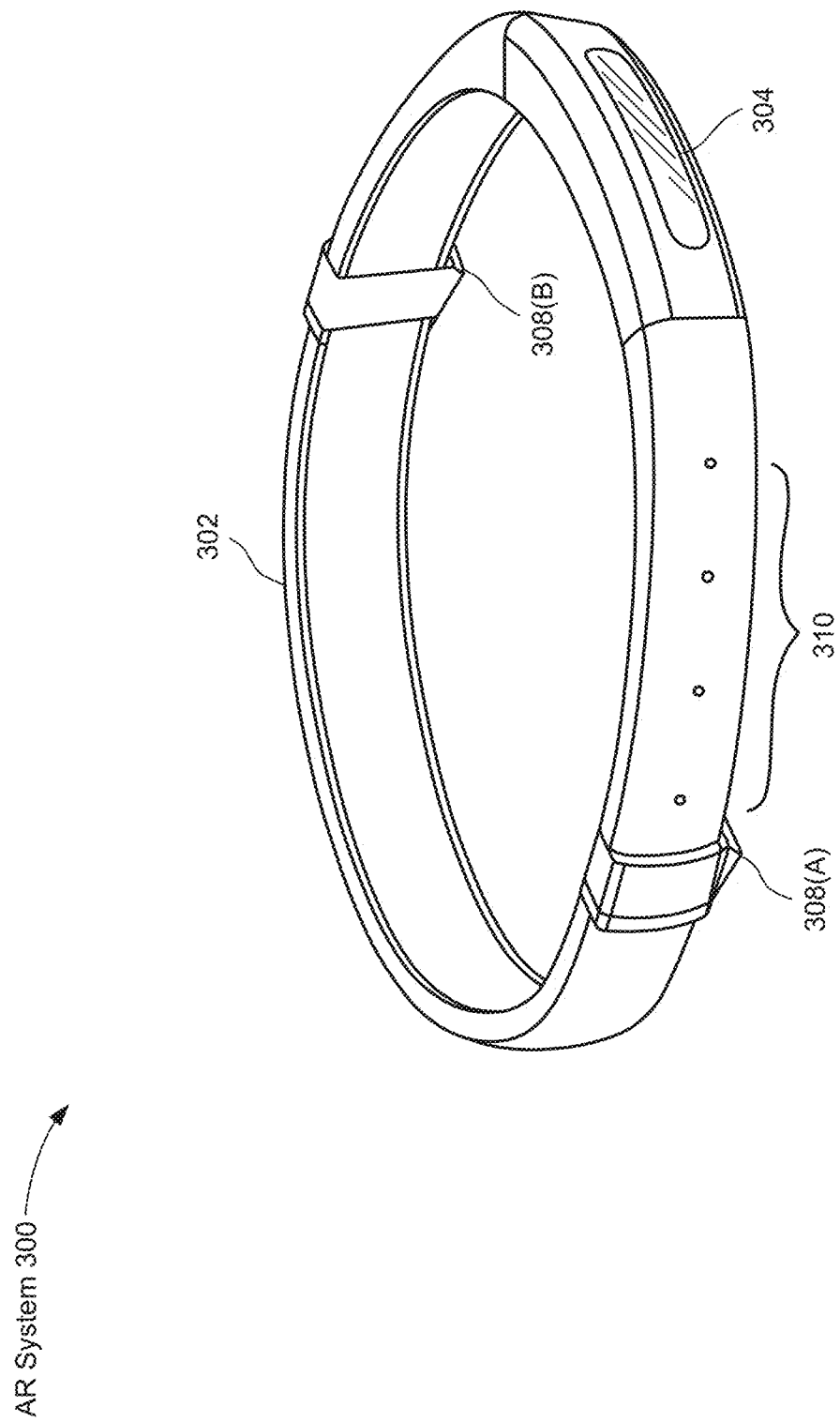
FIG. 3 illustrates an artificial-reality device in accordance with some implementations.
Figure 4:
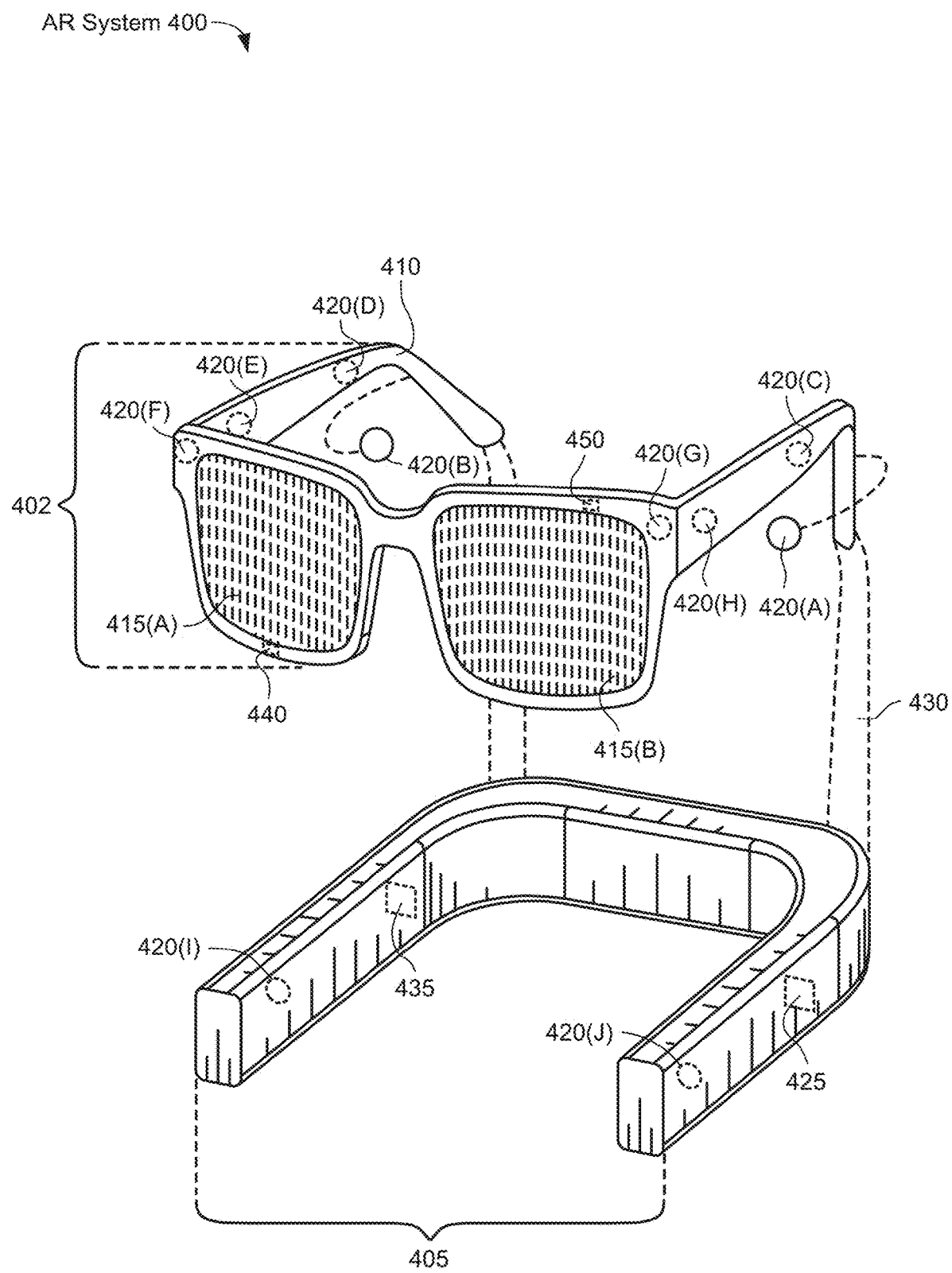
FIG. 4 illustrates an augmented-reality headset and a corresponding neckband in accordance with some implementations.
Figure 5:
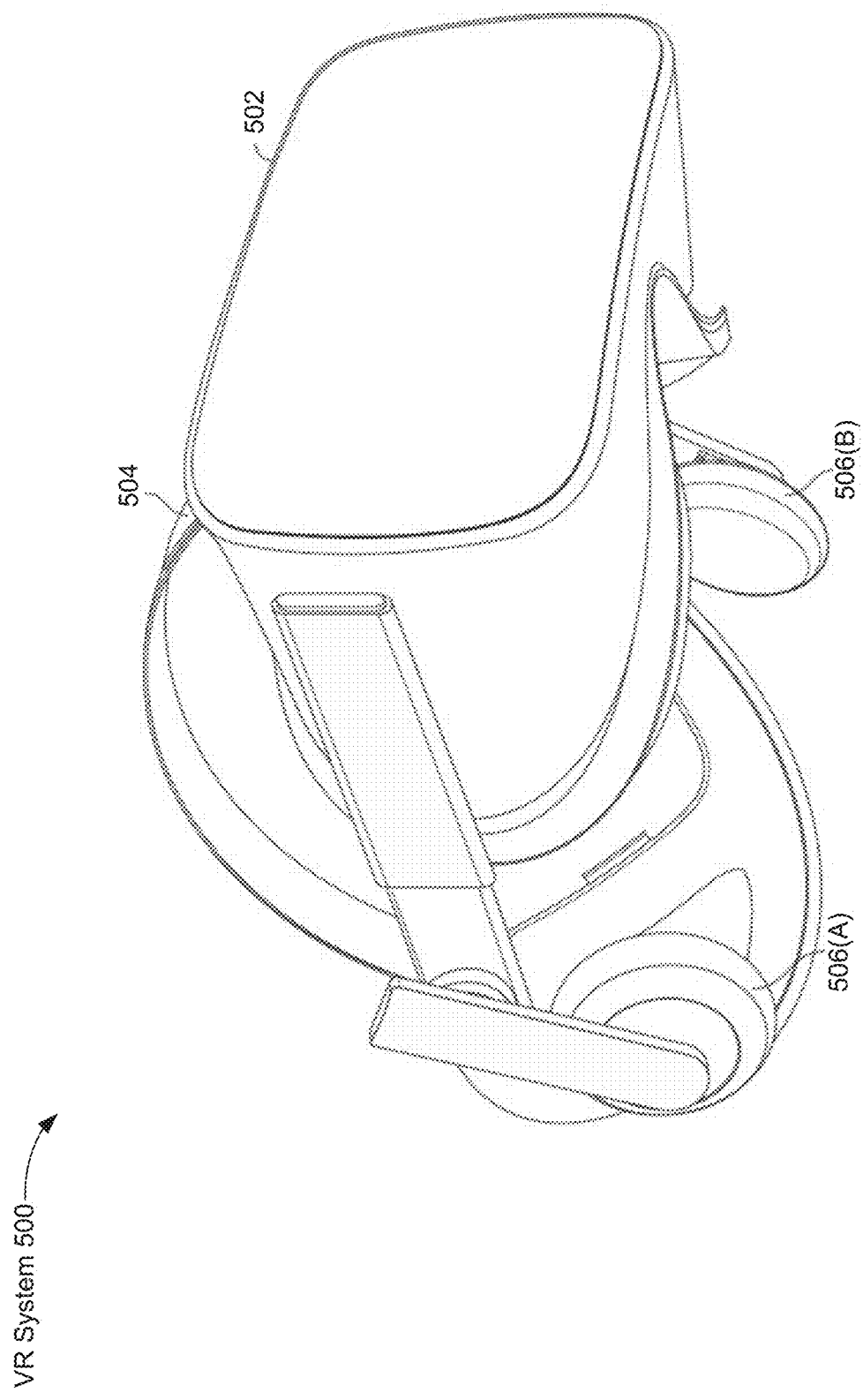
FIG. 5 illustrates a virtual-reality headset in accordance with some implementations.

FIGS. 3-5 provide examples of artificial-reality devices. The AR system 300 in FIG. 3 generally represents a wearable device dimensioned to fit about a body part of a user. As shown, the AR system 300 includes a frame 302 (e.g., a band) and a camera assembly 304, which is coupled to the frame 302 and configured to gather information about a local environment by observing the local environment. The AR system 300 may also include one or more transducers. In one example, the AR system 300 includes output transducers 308(A) and 308(B) and input transducers 310. The output transducers 308(A) and 308(B) may provide audio feedback, haptic feedback, and/or content to a user, and the input audio transducers may capture audio (or other signals/waves) in a user's environment.

Thus, the AR system 300 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 300 may not include a NED, the AR system 300 may include other types of screens or visual feedback devices (e.g., a display screen integrated into a side of the frame 302).

The implementations discussed in this disclosure may also be implemented in AR systems that include one or more NEDs. For example, as shown in FIG. 4, the AR system 400 may include an eyewear device 402 with a frame 410 configured to hold a right display device 415(A) and a left display device 415(B) in front of a user's eyes (the left and right display are also referred to herein as a "left lens" and a "right lens"). The display devices 415(A) and 415(B) may act together or independently to present an image or series of images to a user. While the AR system 400 includes two displays, implementations of this disclosure may be implemented in AR systems with a single NED or more than two NEDs.

In some implementations, the AR system 400 includes one or more sensors, such as the sensors 440 and 450. The sensors 440 and 450 may generate measurement signals in response to motion of the AR system 400 and may be located on substantially any portion of the frame 410. Each sensor may be a position sensor, an inertial measurement unit (IMU), a depth camera assembly, or any combination thereof. The AR system 400 may include zero or more sensors. In implementations in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

The AR system 400 may also include a microphone array with a plurality of acoustic sensors 420(A)-420(J), referred to collectively as the acoustic sensors 420. The acoustic sensors 420 may detect air pressure variations induced by sound waves. Each acoustic sensor 420 may be configured to detect sound and convert the detected sound into an electronic format (e.g., an analog or digital format). The microphone array in FIG. 4 may include, for example, ten acoustic sensors: 420(A) and 420(B), which may be designed to be placed inside a corresponding ear of the user, acoustic sensors 420(C), 420(D), 420(E), 420(F), 420(G), and 420(H), which may be positioned at various locations on the frame 410, and/or acoustic sensors 420(I) and 420(J), which may be positioned on a corresponding neckband 405.

The configuration of the acoustic sensors 420 of the microphone array may vary. While the AR system 400 is shown in FIG. 4 having ten acoustic sensors 420, the number of acoustic sensors 420 may be greater or less than ten. In some implementations, using more acoustic sensors 420 may increase the amount of audio information collected and/or the sensitivity and accuracy of the audio information. In contrast, using a lower number of acoustic sensors 420 may decrease the computing power required by a controller 425 to process the collected audio information. In addition, the position of each acoustic sensor 420 of the microphone array may vary. For example, the position of an acoustic sensor 420 may include a defined position on the user, a defined coordinate on the frame 410, an orientation associated with each acoustic sensor, or some combination thereof.

The acoustic sensors 420(A) and 420(B) may be positioned on different parts of the user's ear, such as behind the pinna or within the auricle or fossa. Or, there may be additional acoustic sensors on or surrounding the ear in addition to acoustic sensors 420 inside the ear canal. Having an acoustic sensor positioned next to an ear canal of a user may enable the microphone array to collect information on how sounds arrive at the ear canal. By positioning at least two of the acoustic sensors 420 on either side of a user's head (e.g., as binaural microphones), the AR device 400 may simulate binaural hearing and capture a 3D stereo sound field around about a user's head (e.g., capture 3D stereo sound generated by the right display 415(A) and/or the left display 415(B)). In some implementations, the acoustic sensors 420(A) and 420(B) may be connected to the AR system 400 via a wired connection, and in other implementations, the acoustic sensors 420(A) and 420(B) may be connected to the AR system 400 via a wireless connection (e.g., a Bluetooth connection). In still other implementations, the acoustic sensors 420(A) and 420(B) may not be used at all in conjunction with the AR system 400.

The acoustic sensors 420 on the frame 410 may be positioned along the length of the temples, across the bridge, above or below the display devices 415(A) and 415(B), or some combination thereof. The acoustic sensors 420 may be oriented such that the microphone array is able to detect sounds in a wide range of directions surrounding the user wearing AR system 400. In some implementations, an optimization process may be performed during manufacturing of the AR system 400 to determine relative positioning of each acoustic sensor 420 in the microphone array.

The AR system 400 may further include one or more transducers (e.g., mechanical oscillators), which may be collectively referred to as a transducer array. In some implementations, each transducer includes hardware capable of generating signals (e.g., mechanical waves such as soundwaves, ultrasound waves, or other waves and signals, such as electromagnetic waves). For example, each transducer can convert electrical signals into ultrasound waves (or various other waves). The transducers may be miniature piezoelectric transducers, capacitive transducers, single or multipole voice coil motors, and/or any other suitable device for creation of signals. The one or more transducers are configured to generate signals that vibrate one or more of the frame 410, the right display 415(A), and the left display 415(B).

The AR system 400 may further include or be connected to an external device (e.g., a paired device), such as a neckband 405. As shown, the neckband 405 may be coupled to the eyewear device 402 via one or more connectors 430. The connectors 430 may be wired or wireless connectors and may include electrical and/or non-electrical (e.g., structural) components. In some cases, the eyewear device 402 and the neckband 405 may operate independently without any wired or wireless connection between them. While FIG. 4 illustrates the components of the eyewear device 402 and the neckband 405 in example locations on the eyewear device 402 and the neckband 405, the components may be located elsewhere and/or distributed differently on the eyewear device 402 and/or the neckband 405. In some implementations, the components of the eyewear device 402 and the neckband 405 may be located on one or more additional peripheral devices paired with the eyewear device 402, the neckband 405, or some combination thereof. Furthermore, the neckband 405 generally represents any type or form of paired device. Thus, the following discussion of neckband 405 also applies to various other paired devices, such as smart watches, smart phones, wrist bands, other wearable devices, hand-held controllers, tablet computers, or laptop computers.

Pairing external devices, such as a neckband 405, with AR eyewear devices may enable the eyewear devices to achieve the form factor of a pair of glasses while still providing sufficient battery and computation power for expanded capabilities. Some or all of the battery power, computational resources, and/or additional features of the AR system 400 may be provided by a paired device or shared between a paired device and an eyewear device, thus reducing the weight, heat profile, and form factor of the eyewear device overall while still retaining desired functionality. For example, the neckband 405 may allow components that would otherwise be included on an eyewear device to be included in the neckband 405 because users may tolerate a heavier weight load on their shoulders than they would tolerate on their heads. The neckband 405 may also have a larger surface area over which to diffuse and disperse heat to the ambient environment. Thus, the neckband 405 may allow for greater battery and computation capacity than might otherwise have been possible on a stand-alone eyewear device. Because weight carried in the neckband 405 may be less invasive to a user than weight carried in the eyewear device 402, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 405 may be communicatively coupled with the eyewear device 402 and/or to other devices. The other devices may provide certain functions (e.g., tracking, localizing, depth mapping, processing, or storage) to the AR system 400. In the implementation of FIG. 4, the neckband 405 includes two acoustic sensors 420(I) and 420(J), which are part of the microphone array (or potentially form their own microphone subarray). The neckband 405 may also include a controller 425 and a power source 435.

The acoustic sensors 420(I) and 420(J) of the neckband 405 may be configured to detect sound and convert the detected sound into an electronic format (analog or digital). In the implementation of FIG. 4, the acoustic sensors 420(I) and 420(J) are positioned on the neckband 405, thereby increasing the distance between neckband acoustic sensors 420(I) and 420(J) and the other acoustic sensors 420 positioned on the eyewear device 402. In some cases, increasing the distance between the acoustic sensors 420 of the microphone array improves the accuracy of beamforming performed via the microphone array. For example, if a sound is detected by the acoustic sensors 420(C) and 420(D) and the distance between acoustic sensors 420(C) and 420(D) is greater than, for example, the distance between the acoustic sensors 420(D) and 420(E), the determined source location of the detected sound may be more accurate than if the sound had been detected by the acoustic sensors 420(D) and 420(E).

The controller 425 of the neckband 405 may process information generated by the sensors on the neckband 405 and/or the AR system 400. For example, the controller 425 may process information from the microphone array, which describes sounds detected by the microphone array. For each detected sound, the controller 425 may perform a direction of arrival (DOA) estimation to estimate a direction from which the detected sound arrived at the microphone array. As the microphone array detects sounds, the controller 425 may populate an audio data set with the information (e.g., which may be used to adjust operation of the transducers). In implementations in which the AR system 400 includes an IMU, the controller 425 may compute all inertial and spatial calculations from the IMU located on the eyewear device 402. The connector 430 may convey information between the AR system 400 and the neckband 405 and between the AR system 400 and the controller 425. The information may be in the form of optical data, electrical data, wireless data, or any other transmittable data form. Moving the processing of information generated by the AR system 400 to the neckband 405 may reduce weight and heat in the eyewear device 402, making it more comfortable to a user.

The power source 435 in the neckband 405 may provide power to the eyewear device 402 and/or to the neckband 405. The power source 435 may include, without limitation, lithium-ion batteries, lithium-polymer batteries, primary lithium batteries, alkaline batteries, or any other form of power storage. In some cases, the power source 435 is a wired power source. Including the power source 435 on the neckband 405 instead of on the eyewear device 402 may help better distribute the weight and heat generated by the power source 435.

As noted, some artificial reality systems may, instead of blending an artificial reality with actual reality, substantially replace one or more of a user's sensory perceptions of the real world with a virtual experience. One example of this type of system is a head-worn display system, such as the VR system 500 in FIG. 5, which mostly or completely covers a user's field of view. The VR system 500 may include a front rigid body 502 and a band 504 shaped to fit around a user's head. The VR system 300 may also include output audio transducers 506(A) and 506(B). Furthermore, while not shown in FIG. 5, the front rigid body 502 may include one or more electronic elements, including one or more electronic displays, one or more IMUS, one or more tracking emitters or detectors, and/or any other suitable device or system for creating an artificial reality experience.

Artificial-reality systems may include a variety of types of visual feedback mechanisms. For example, display devices in the AR system 400 and/or the VR system 500 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial reality systems also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 400 and/or the VR system 500 may include micro-LED projectors that project light (e.g., using a waveguide) into display devices, such as clear combiner lenses, which allow ambient light to pass through. The display devices may refract the projected light toward a user's pupil and may enable a user to simultaneously view both artificial reality content and the real world. Artificial-reality systems may also be configured with any other suitable type or form of image projection system.

Artificial-reality systems may also include various types of computer vision components and subsystems. For example, the AR system 300, the AR system 400, and/or the VR system 500 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 3 and 5, the output audio transducers 308(A), 308(B), 506(A), and 506(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 310 may include condenser microphones, dynamic microphones, ribbon microphones, and/or any other type or form of input transducer. In some implementations, a single transducer may be used for both audio input and audio output. In some implementations, transducers (e.g., voice coils, piezoelectrics, and the like) are coupled to the displays of AR/VR systems, and the transducers transform the displays into output audio devices (i.e., speakers).

The artificial-reality systems shown in FIGS. 3-5 may include tactile (i.e., haptic) feedback systems, which may be incorporated into headwear, gloves, body suits, handheld controllers, environmental devices (e.g., chairs or floormats), and/or any other type of device or system. Additionally, in some implementations, the haptic feedback systems may be incorporated with the artificial reality systems. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms, as described herein. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The implementations disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 300, 400, and 500) may incorporate any or all of these types of sensors to perform SLAM operations such as creating and continually updating maps of a device's or a user's current environment. In at least some of the implementations described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

The artificial reality systems described above in connection with FIGS. 3-5 may also include memory (e.g., the neckband 405 in FIG. 4 may include memory). The memory may be high-speed random access memory, such as DRAM, SRAM, DDR SRAM, or other random access solid state memory devices. In some implementations, the memory includes non-volatile memory, such as one or more magnetic disk storage devices, one or more optical disk storage devices, one or more flash memory devices, or one or more other non-volatile solid state storage devices. The memory, or alternatively the non-volatile memory within the memory, includes a non-transitory computer-readable storage medium. In some implementations, the memory, or the non-transitory computer-readable storage medium of the memory stores the following programs, modules, and data structures, or a subset or superset thereof:

operating logic, including procedures for handling various basic system services and for performing hardware dependent tasks;

a communication module for coupling to and/or communicating with other devices (e.g., an artificial-reality headset, remote server, or other artificial-realty system) in conjunction with a communication interface (wired or wireless interface);

an artificial-reality generation module, which is used for generating artificial-reality images, including potential targets, and sending corresponding video and audio data to the headset and transducers. In some implementations, the artificial-reality generation module is a virtual-reality generation module, an augmented-reality generation module, a mixed-reality generation module, or some combination thereof;

an HRTF ("Head-Related Transfer Function") generation module, which is used for computing HRTF filters based on sound profiles (e.g., energy contributions) of audio sources;

an audio output module, which is used for convolving the computed HRTF filters with dry input sound to produce final audio data;

a signal generating module, which generates signals (e.g., in conjunction with transducers and the audio output module) signals. In some implementations, the signal generating module includes a characteristics selection module, which is used for selecting values of signals characteristics for signals generated by the transducers;

a display module, which is used for displaying media (e.g., virtual-reality images, augmented-reality images, and/or mixed-reality images) in conjunction with the headset; and one or more databases, which store data, including:
spherical harmonic HRTF coefficients;
artificial-reality applications;
communication protocol information for storing and managing protocol information for one or more protocols (e.g., custom or standard wireless protocols, such as ZigBee or Z-Wave, and/or custom or standard wired protocols, such as Ethernet);
parameters describing anatomical features of one or more users; and a library of templates (e.g., for each user and/or a general library of templates for a plurality of users) that can be matched with a user input to predict a target selection.

In some implementations, the memory also includes a feature identification module, which receives images of the user captured by a camera and identifies a set of anatomical features from the images, which describe physical characteristics of a user relevant to the user's HRTF. The set of anatomical features may include, for example, the head diameter, shoulder width, height, and shape and size of the pinnae. The anatomical features may be identified through any image processing or analysis algorithm.

In some implementations, the artificial-reality applications are implemented as software modules, which are stored on the storage device and executed by the processor. Each artificial-reality application is a group of instructions that, when executed by a processor of the artificial reality system, generates artificial-reality content (e.g., images, audio, or haptic feedback) for presentation to the user. An artificial-reality application may generate artificial-reality content in response to inputs received from the user via movement of the headset.

Each of the above identified elements may be stored in one or more of the previously mentioned memory devices, and corresponds to a set of instructions for performing the function(s) described. The above identified modules or programs (e.g., sets of instructions) need not be implemented as separate software programs, procedures, or modules, and thus various subsets of these modules can be combined or otherwise rearranged in various implementations. In some implementations, the memory stores a subset of the modules and data structures identified above.

The artificial-reality systems described above in connection with FIGS. 3-5 may facilitate and/or contribute to artificial-reality experiences for users.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A battery system, comprising:
    a first battery cell connected in parallel to a second battery cell, each of the first and second battery cells including a respective positive tab and a respective negative tab extending from a respective side in a first direction;
    a plurality of thermal switch devices, each of the thermal switch devices electrically coupled to a respective battery cell; and
    a rigid-flex circuit board including a first rigid region, a second rigid region, and a first flexible region, wherein:
        the first rigid region is electrically coupled to the positive and negative tabs of the first battery cell;
        the second rigid region is electrically coupled to the positive and negative tabs of the second battery cell;
        the first rigid region is physically and electrically connected to the second rigid region by the first flexible region; and
        the first flexible region is bent along an axis parallel to the first direction such that the first battery cell is stacked on top of the second battery cell.

2. The battery system of claim 1, wherein a first thermal switch device of the plurality of thermal switch devices is configured to prevent abnormal current flow between the first battery cell that is coupled to the first thermal switch device and the second battery cell that is adjacent to the first battery cell.

3. The battery system of claim 2, wherein the first thermal switch device is electrically coupled to the first battery cell via its positive tab and prevents the abnormal current flow by limiting a flow of current from the first battery cell via its positive tab when an operating temperature exceeds a threshold temperature.

4. The battery system of claim 1, wherein each of the thermal switch devices is one of a temperature cut off (TCO) device or a positive temperature coefficient (PTC) device.

5. The battery system of claim 1, wherein the number of thermal switch devices is less than the number of battery cells.

6. The battery system of claim 5, wherein a battery cell with a positive tab welded to a rigid region at a respective end of the rigid-flex circuit board is not coupled to a thermal switch device.

7. The battery system of claim 1, wherein the first and second battery cells are electrically connected in parallel to a protection circuit that protects the battery system from one or more failure modes.

8. The battery system of claim 1, wherein the battery system includes at least three battery cells.

9. The battery system of claim 1, wherein the first and second rigid regions are physically coupled to respective positive and negative tabs of the first and second battery cells by welding.

* * * * *